(12) United States Patent
Aoki et al.

(10) Patent No.: US 11,512,185 B2
(45) Date of Patent: Nov. 29, 2022

(54) RUBBER COMPOSITION AND TIRE

(71) Applicant: BRIDGESTONE CORPORATION, Tokyo (JP)

(72) Inventors: Misa Aoki, Tokyo (JP); Seiichi Tahara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 197 days.

(21) Appl. No.: 16/899,905

(22) Filed: Jun. 12, 2020

(65) Prior Publication Data

US 2020/0308376 A1 Oct. 1, 2020

Related U.S. Application Data

(63) Continuation of application No. PCT/JP2018/045973, filed on Dec. 13, 2018.

(30) Foreign Application Priority Data

Dec. 14, 2017 (JP) .............................. JP2017-240084

(51) Int. Cl.
*C08L 9/06* (2006.01)
*C08L 53/00* (2006.01)
*C08K 3/36* (2006.01)
*B60C 1/00* (2006.01)

(52) U.S. Cl.
CPC .............. *C08L 9/06* (2013.01); *B60C 1/0016* (2013.01); *C08K 3/36* (2013.01); *C08L 53/00* (2013.01); *C08K 2201/006* (2013.01); *C08L 2207/04* (2013.01)

(58) Field of Classification Search
CPC ... C08L 9/06; C08L 53/00; C08K 3/36; B60C 1/00
USPC ........................................................ 523/156
See application file for complete search history.

(56) References Cited

U.S. PATENT DOCUMENTS

| 8,759,438 | B2 | 6/2014 | Lopez et al. |
| 9,475,923 | B2 | 10/2016 | Matsumoto et al. |
| 2012/0214933 | A1* | 8/2012 | Lopez .................. B60C 1/0016 524/502 |
| 2012/0318425 | A1* | 12/2012 | Lopez ..................... C08L 7/00 152/526 |
| 2016/0376426 | A1 | 12/2016 | Kimura |
| 2018/0186184 | A1 | 7/2018 | Chouvel |
| 2018/0319960 | A1 | 11/2018 | Saji et al. |

FOREIGN PATENT DOCUMENTS

| CN | 102803370 A | 11/2012 |
| CN | 103958600 A | 7/2014 |
| JP | 2007154132 A * | 6/2007 |
| JP | 2012-531486 A | 12/2012 |
| JP | 2013-245306 A | 12/2013 |
| JP | 2014-133845 A | 7/2014 |
| JP | 2014-189698 A | 10/2014 |
| JP | 2015-110703 A | 6/2015 |
| WO | 2015/079703 A1 | 6/2015 |
| WO | 2016/202645 A1 | 12/2016 |
| WO | 2017/077712 A1 | 5/2017 |
| WO | 2017/103387 A1 | 6/2017 |

OTHER PUBLICATIONS

International Preliminary Report on Patentability dated Jun. 16, 2020 from the International Bureau in International Application No. PCT/JP2018/045973.
International Search Report for PCT/JP2018/045973 dated Mar. 5, 2019.
Chinese Search Report dated Nov. 15, 2021 from the China National Intellectual Property Administration in Chinese Application No. 201880080325.1.

* cited by examiner

*Primary Examiner* — Deve V Hall
(74) *Attorney, Agent, or Firm* — Sughrue Mion, PLLC

(57) ABSTRACT

Provided is a rubber composition that achieves both wet performance and low loss property while delivering excellent dry handling performance. A rubber composition comprises: a rubber component; and a styrene-alkylene block copolymer, wherein a total styrene content of the styrene-alkylene block copolymer is 30 mass % or more with respect to a total mass of the styrene-alkylene block copolymer, and the rubber component contains a styrene butadiene rubber having a styrene content of 30 mass % or more.

13 Claims, No Drawings

RUBBER COMPOSITION AND TIRE

CROSS REFERENCE TO RELATED APPLICATION

This application claims priority to and the benefit of Japanese Patent Application No. 2017-240084 filed on Dec. 14, 2017, the entire disclosure of which is incorporated herein by reference.

TECHNICAL FIELD

The present disclosure relates to a rubber composition and a tire.

BACKGROUND

In response to global moves to regulate carbon dioxide emissions with the increased interest in environmental problems in recent years, demand to improve the fuel efficiency of automobiles is growing. To meet such demand, regarding tire performance, reduction in rolling resistance is required. As techniques for reducing the rolling resistance of tires, tire structure optimization techniques have conventionally been studied. Meanwhile, techniques of using, as a rubber composition used in a tire, a rubber composition having low tan δ (hereafter referred to as "low loss property") and excellent low heat generating property are also commonly employed today.

Moreover, tires provided with both wet performance and low loss property by using styrene butadiene rubber and silica are conventionally mainstream.

CITATION LIST

Patent Literatures

PTL 1: WO 2015/079703 A1
PTL 2: WO 2017/077712 A1

SUMMARY

Technical Problem

It has been found out in recent years that wet performance and low loss property can be further improved by blending a larger amount of a thermoplastic resin or a softener than before, with natural rubber as a base (for example, see PTL 1 and PTL 2). In such a case, however, there is room for improvement in wear resistance performance and steering stability on a dry road surface (dry handling performance).

It could therefore be helpful to provide a rubber composition that achieves both wet performance and low loss property while delivering excellent dry handling performance. It could also be helpful to provide a tire that achieves both wet performance and low loss property while delivering excellent dry handling performance.

Solution to Problem

A rubber composition according to the present disclosure is a rubber composition comprising: a rubber component; and a styrene-alkylene block copolymer, wherein a total styrene content of the styrene-alkylene block copolymer is 30 mass % or more with respect to a total mass of the styrene-alkylene block copolymer, and the rubber component contains a styrene butadiene rubber having a styrene content of 30 mass % or more.

Thus, both wet performance and low loss property can be achieved while delivering excellent dry handling performance.

A tire according to the present disclosure is a tire produced using the foregoing rubber composition.

Thus, both wet performance and low loss property can be achieved while delivering excellent dry handling performance.

Advantageous Effect

It is thus possible to provide a rubber composition that achieves both wet performance and low loss property while delivering excellent dry handling performance. It is also possible to provide a tire that achieves both wet performance and low loss property while delivering excellent dry handling performance.

DETAILED DESCRIPTION

One of the disclosed embodiments will be described below. The following description is intended for illustrative purposes only, and is not intended to limit the scope of the present disclosure in any way.

(Rubber Composition)

A rubber composition according to the present disclosure comprises a rubber component and a styrene-alkylene block copolymer, wherein the total styrene content of the styrene-alkylene block copolymer is 30 mass % or more with respect to the total mass of the styrene-alkylene block copolymer, and the rubber component contains a styrene butadiene rubber having a styrene content of 30 mass % or more.

Thus, both wet performance and low loss property can be achieved while delivering excellent dry handling performance.

Without being limited by theory, it is presumed that these effects are produced because the total styrene content in the styrene-alkylene block copolymer is high, i.e. 30 mass % or more, and the styrene block acts like a filler in a vulcanizate of the rubber composition, whereas the alkylene block is present between the styrene blocks and rubbing of the styrene blocks against each other is reduced.

<Rubber Component>

The rubber component is not limited as long as it contains a styrene butadiene rubber having a styrene content of 30 mass % or more. In addition to the styrene butadiene rubber, rubber components used in commonly known rubber compositions may be used. Examples of such rubber components include natural rubber (NR), butadiene rubber (BR), styrene butadiene rubber having a styrene content of less than 30 mass %, acrylonitrile butadiene rubber, chloroprene rubber, polyisoprene rubber, and derivatives thereof. One of these rubber components may be used individually, or two or more of these rubber components may be used in combination.

For example, the proportion of the styrene butadiene rubber having a styrene content of 30 mass % or more in the rubber component is 20 mass % or more, 50 mass % or more, 70 mass % or more, or 100 mass %, and 100 mass % or less, 70 mass % or less, or 50 mass % or less.

In the rubber composition according to the present disclosure, the proportion of the styrene butadiene rubber having a styrene content of 30 mass % or more in the rubber component is preferably 50 mass % or more.

Thus, the effect of wet performance can be achieved while delivering excellent dry handling performance.

The rubber composition according to the present disclosure preferably contains, as the rubber component, one or more selected from the group consisting of an unmodified SBR and a modified SBR.

The rubber composition according to the present disclosure preferably contains, as the rubber component, a modified conjugated diene-based polymer such as a modified SBR.

As the modified conjugated diene-based polymer, for example, the following modified conjugated diene-based polymer (A) is preferable. The modified conjugated diene-based polymer (A) has a weight-average molecular weight of $20 \times 10^4$ or more and $300 \times 10^4$ or less, contains 0.25 mass % or more and 30 mass % or less of a modified conjugated diene-based polymer having a molecular weight of $200 \times 10^4$ or more and $500 \times 10^4$ or less with respect to the total amount of the modified conjugated diene-based polymer (A), and has a contracting factor (g') of less than 0.64. With the modified conjugated diene-based polymer (A), the low loss property can be further improved.

Preferably, the modified conjugated diene-based polymer (A) has a branch with a branching degree of 5 or more. As a result of using such a rubber composition in a tire, the wet performance of the tire can be further improved.

Preferably, the modified conjugated diene-based polymer (A) has one or more coupling residual groups and conjugated diene-based polymer chains that bind to the coupling residual groups, and the branch includes a branch in which five or more conjugated diene-based polymer chains bind to one coupling residual group. As a result of using such a rubber composition in a tire, the wet performance of the tire can be further improved.

Preferably, the modified conjugated diene-based polymer (A) is represented by the following General Formula (I):

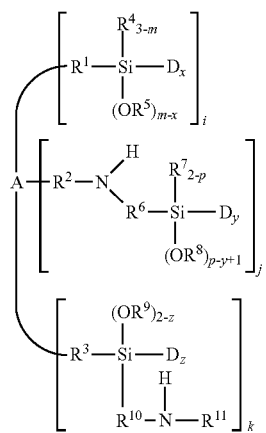

(I)

[in General Formula (I), D represents a conjugated diene-based polymer chain, $R^1$, $R^2$, and $R^3$ each independently represent a single bond or an alkylene group having a carbon number of 1 to 20, $R^4$ and $R^7$ each independently represent an alkyl group having a carbon number of 1 to 20, $R^5$, $R^8$, and $R^9$ each independently represent a hydrogen atom or an alkyl group having a carbon number of 1 to 20, $R^6$ and $R^{10}$ each independently represent an alkylene group having a carbon number of 1 to 20, $R^{11}$ represents a hydrogen atom or an alkyl group having a carbon number of 1 to 20, m and x each independently represent an integer of 1 to 3 where x≤m, p represents 1 or 2, y represents an integer of 1 to 3 where y≤(p+1), z represents an integer of 1 or 2, a plurality of each of D, $R^1$ to $R^{11}$, m, p, x, y, and z, if present, are each independent, i represents an integer of 0 to 6, j represents an integer of 0 to 6, k represents an integer of 0 to 6, (i+j+k) represents an integer of 3 to 10, ((x×i)+(y×j)+(z×k)) represents an integer of 5 to 30, and A represents a hydrocarbon group having a carbon number of 1 to 20 or an organic group containing at least one atom selected from the group consisting of an oxygen atom, a nitrogen atom, a silicon atom, a sulfur atom, and a phosphorus atom and not containing active hydrogen]. As a result of using such a rubber composition in a tire, the wear resistance performance of the tire can be improved.

Preferably, in General Formula (I), A is represented by any of the following General Formulas (II) to (V):

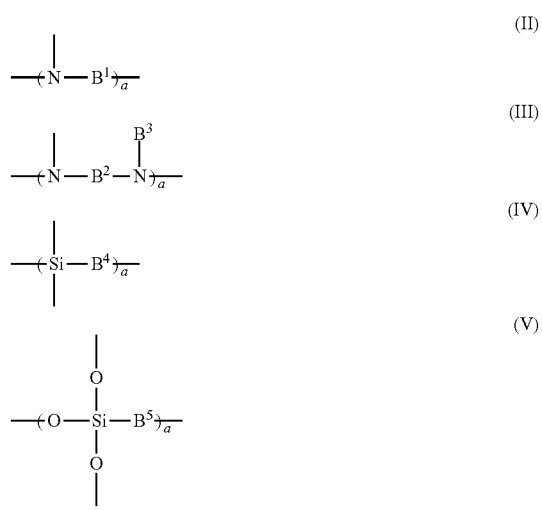

[in General Formula (II), $B^1$ represents a single bond or a hydrocarbon group having a carbon number of 1 to 20, a represents an integer of 1 to 10, and a plurality of $B^1$, if present, are each independent, in General Formula (III), $B^2$ represents a single bond or a hydrocarbon group having a carbon number of 1 to 20, $B^3$ represents an alkyl group having a carbon number of 1 to 20, a represents an integer of 1 to 10, a plurality of $B^2$, if present, are each independent, and a plurality of $B^3$, if present, are each independent, in General Formula (IV), $B^4$ represents a single bond or a hydrocarbon group having a carbon number of 1 to 20, a represents an integer of 1 to 10, and a plurality of $B^4$, if present, are each independent, and in General Formula (V), $B^5$ represents a single bond or a hydrocarbon group having a carbon number of 1 to 20, a represents an integer of 1 to 10, and a plurality of $B^5$, if present, are each independent]. As a result of using such a rubber composition in a tire, the low loss property, wet performance, and wear resistance performance of the tire can all be achieved to high levels.

Preferably, the modified conjugated diene-based polymer (A) is obtained by reacting a conjugated diene-based polymer with a coupling agent represented by the following General Formula (VI):

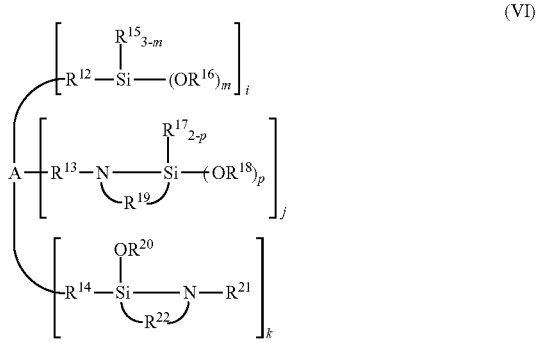

(VI)

[in General Formula (VI), $R^{12}$, $R^{13}$, and $R^{14}$ each independently represent a single bond or an alkylene group having a carbon number of 1 to 20, $R^{15}$, $R^{16}$, $R^{17}$, $R^{18}$, and $R^{20}$ each independently represent an alkyl group having a carbon number of 1 to 20, $R^{19}$ and $R^{22}$ each independently represent an alkylene group having a carbon number of 1 to 20, $R^{21}$ represents an alkyl group or a trialkyl silyl group having a carbon number of 1 to 20, m represents an integer of 1 to 3, p represents 1 or 2, a plurality of each of $R^{12}$ to $R^{22}$, m, and p, if present, are each independent, i, j, and k each independently represent an integer of 0 to 6 where (i+j+k) is an integer of 3 to 10, and A represents a hydrocarbon group having a carbon number of 1 to 20 or an organic group containing at least one atom selected from the group consisting of an oxygen atom, a nitrogen atom, a silicon atom, a sulfur atom, and a phosphorus atom and not containing active hydrogen]. As a result of using such a rubber composition in a tire, the wear resistance performance of the tire can be improved.

Preferably, the coupling agent represented by General Formula (VI) is at least one selected from the group consisting of tetrakis [3-(2,2-dimethoxy-1-aza-2-silacyclopentane)propyl]-1,3-propanediami ne, tetrakis(3-trimethoxysilylpropyl)-1,3-propanediamine, and tetrakis(3-trimethoxysilylpropyl)-1,3-bisaminomethylcyclohexane. As a result of using such a rubber composition in a tire, the wear resistance performance of the tire can be further improved.

Typically, a branched polymer tends to have smaller molecular size than a linear polymer with the same absolute molecular weight. The contracting factor (g') is an index of the ratio of the size of the molecule to a linear polymer assumed to have the same absolute molecular weight. That is, the contracting factor (g') tends to be lower when the branching degree of the polymer is higher. In this embodiment, intrinsic viscosity is used as an index of the molecular size, and the linear polymer is assumed to be in accordance with a relational expression of intrinsic viscosity $[\eta]=-3.883M^{0.771}$. The contracting factor (g') of the modified conjugated diene-based polymer at each absolute molecular weight is calculated, and an average value of contracting factors (g') when the absolute molecular weight is $100\times10^4$ to $200\times10^4$ is taken to be the contracting factor (g') of the modified conjugated diene-based polymer. Herein, the "branch" is formed as a result of another polymer directly or indirectly binding to one polymer. The "branching degree" is the number of polymers directly or indirectly binding to each other for one branch. For example, in the case where the below-described five conjugated diene-based polymer chains indirectly bind to each other through the below-described coupling residual group, the branching degree is 5. The "coupling residual group" is a structural unit of a modified conjugated diene-based polymer that is bound to a conjugated diene-based polymer chain, and is, for example, a coupling agent-derived structural unit obtained by reacting the below-described conjugated diene-based polymer and coupling agent. The "conjugated diene-based polymer chain" is a structural unit of a modified conjugated diene-based polymer, and is, for example, a conjugated diene-based polymer-derived structural unit obtained by reacting the below-described conjugated diene-based polymer and coupling agent.

The contracting factor (g') is less than 0.64, preferably 0.63 or less, more preferably 0.60 or less, further preferably 0.59 or less, and still more preferably 0.57 or less. No lower limit is placed on the contracting factor (g'), and the contracting factor (g') may be less than or equal to a detection limit. The contracting factor (g') is preferably 0.30 or more, more preferably 0.33 or more, further preferably 0.35 or more, still more preferably 0.45 or more, and still further preferably 0.59 or more. The use of the modified conjugated diene-based polymer (A) whose contracting factor (g') is in this range improves the processability of the rubber composition.

Since the contracting factor (g') tends to depend on the branching degree, for example, the contracting factor (g') can be controlled using the branching degree as an index. Specifically, a modified conjugated diene-based polymer with a branching degree of 6 tends to have a contracting factor (g') of 0.59 or more and 0.63 or less, and a modified conjugated diene-based polymer with a branching degree of 8 tends to have a contracting factor (g') of 0.45 or more and 0.59 or less.

The following method is used to measure the contracting factor (g'). A modified conjugated diene-based polymer is used as a sample to perform measurement using a GPC measurement apparatus ("GPCmax VE-2001" produced by Malvern) including a series of three columns using a polystyrene-based gel as a filler, and using three detectors connected in order of a light scattering detector, an RI detector, and a viscosity detector ("TDA305" produced by Malvern), and, on the basis of standard polystyrene, the absolute molecular weight is obtained based on the results obtained by the light scattering detector and the RI detector, and the intrinsic viscosity is obtained based on the results obtained by the RI detector and the viscosity detector. Assuming that a linear polymer is in accordance with intrinsic viscosity $[\eta]=-3.883M^{0.771}$, the contracting factor (g') as the ratio of intrinsic viscosity corresponding to each molecular weight is calculated. As an eluent, THF containing 5 mmol/L of triethylamine is used. As the columns, columns available under the trade names "TSKgel G4000HXL", "TSKgel G5000HXL", and "TSKgel G6000HXL" produced by Tosoh Corporation connected to one another are used. 20 mg of the sample for the measurement is dissolved in 10 mL of THF to obtain a measurement solution, and 100 μL of the measurement solution is injected into the GPC measurement apparatus to perform the measurement under conditions of an oven temperature of 40° C. and a THF flow rate of 1 mL/min.

The modified conjugated diene-based polymer (A) preferably has a branch with a branching degree of 5 or more. The modified conjugated diene-based polymer (A) more preferably has one or more coupling residual groups and conjugated diene-based polymer chains that bind to the coupling residual groups, where the branch includes a branch in which five or more conjugated diene-based polymer chains bind to one coupling residual group. By determining the structure of the modified conjugated diene-based polymer so that the branching degree is 5 or more and the branch includes a branch in which five or more conjugated diene-based polymer chains bind to one coupling residual group, the contracting factor (g') can be limited to less than 0.64 more reliably. The number of conjugated diene-based polymer chains that bind to one coupling residual group can be determined from the value of the contracting factor (g').

The modified conjugated diene-based polymer (A) more preferably has a branch with a branching degree of 6 or more. The modified conjugated diene-based polymer (A) further preferably has one or more coupling residual groups and conjugated diene-based polymer chains that bind to the coupling residual groups, where the branch includes a branch in which six or more conjugated diene-based polymer chains bind to one coupling residual group. By determining the structure of the modified conjugated diene-based polymer so that the branching degree is 6 or more and the branch includes a branch in which six or more conjugated diene-based polymer chains bind to one coupling residual group, the contracting factor (g') can be limited to 0.63 or less.

The modified conjugated diene-based polymer (A) further preferably has a branch with a branching degree of 7 or more, and still more preferably has a branch with a branching degree of 8 or more. No upper limit is placed on the branching degree, but the branching degree is preferably 18 or less.

The modified conjugated diene-based polymer (A) still more preferably has one or more coupling residual groups and conjugated diene-based polymer chains that bind to the coupling residual groups where the branch includes a branch in which seven or more conjugated diene-based polymer chains bind to one coupling residual group, and particularly preferably has one or more coupling residual groups and conjugated diene-based polymer chains that bind to the coupling residual groups where the branch includes a branch in which eight or more conjugated diene-based polymer chains bind to one coupling residual group. By determining the structure of the modified conjugated diene-based polymer so that the branching degree is 8 or more and the branch includes a branch in which eight or more conjugated diene-based polymer chains bind to one coupling residual group, the contracting factor (g') can be limited to 0.59 or less.

The modified conjugated diene-based polymer (A) preferably contains a nitrogen atom and a silicon atom. In this case, the rubber composition has favorable processability. As a result of using such a rubber composition in a tire, the low loss property of the tire can be further reduced while improving its wet performance and wear resistance performance. Whether the modified conjugated diene-based polymer (A) contains a nitrogen atom can be determined as follows: If the modification rate calculated by the blow-described modification rate measurement method is 10% or more, it is determined that the modified conjugated diene-based polymer (A) contains a nitrogen atom. Whether the modified conjugated diene-based polymer (A) contains a nitrogen atom can be determined based on whether there is adsorption to a specific column.

Whether the modified conjugated diene-based polymer (A) contains a silicon atom is determined by the following method: Measurement is performed by using 0.5 g of a modified conjugated diene-based polymer as a sample and using an ultraviolet visible spectrophotometer ("UV-1800" produced by Shimadzu Corporation) in accordance with JIS K 0101 44.3.1, and quantitative determination is performed by molybdenum blue absorptiometry. If a silicon atom is detected (detection lower limit: 10 mass ppm), it is determined that the modified conjugated diene-based polymer contains a silicon atom.

At least one end of a conjugated diene-based polymer chain preferably binds to a silicon atom of a coupling residual group. Ends of a plurality of conjugated diene-based polymer chains may bind to one silicon atom. An end of a conjugated diene-based polymer chain and an alkoxy group or hydroxyl group having a carbon number of 1 to 20 may bind to one silicon atom, as a result of which the one silicon atom forms an alkoxy silyl group or silanol group having a carbon number of 1 to 20.

The modified conjugated diene-based copolymer (A) may be an oil-extended polymer to which extender oil has been added. The modified conjugated diene-based copolymer (A) may be non-oil-extended or oil-extended. From the viewpoint of wear resistance performance, the Mooney viscosity measured at 100° C. is preferably 20 or more and 100 or less, and more preferably 30 or more and 80 or less.

The Mooney viscosity is measured by the following method: A conjugated diene-based polymer or a modified conjugated diene-based polymer is used as a sample to measure the Mooney viscosity using a Mooney viscometer ("VR1132" produced by Ueshima Seisakusho Co., Ltd.) and using an L-type rotor in accordance with JIS K6300. The measurement temperature is set to 110° C. when the sample is a conjugated diene-based polymer, and 100° C. when the sample is a modified conjugated diene-based polymer. First, the sample is preheated for 1 min at a test temperature, the rotor is rotated at 2 rpm, and a torque measured after 4 min is taken to be the Mooney viscosity ($ML_{(1+4)}$).

The weight-average molecular weight (Mw) of the modified conjugated diene-based polymer (A) is $20 \times 10^4$ or more and $300 \times 10^4$ or less, preferably $50 \times 10^4$ or more, more preferably $64 \times 10^4$ or more, and further preferably $80 \times 10^4$ or more. The weight-average molecular weight is preferably $250 \times 10^4$ or less, further preferably $180 \times 10^4$ or less, and still more preferably $150 \times 10^4$ or less. If the weight-average molecular weight is $20 \times 10^4$ or more, the low loss property and wet performance of the tire can both be achieved to high levels. If the weight-average molecular weight is $300 \times 10^4$ or less, the processability of the rubber composition is improved.

The number-average molecular weight, the weight-average molecular weight, the molecular weight distribution, and the content of a specific high molecular weight component of each of the modified conjugated diene-based polymer (A) and the below-described conjugated diene-based polymer are measured as follows: A conjugated diene-based polymer or a modified conjugated diene-based polymer is used as a sample to measure a chromatogram using a GPC measurement apparatus ("HLC-8320GPC" produced by Tosoh Corporation) including a series of three columns using a polystyrene-based gel as a filler and using an RI detector ("HLC8020" produced by Tosoh Corporation), and on the basis of a calibration curve obtained using standard polystyrene, the weight-average molecular weight (Mw), the number-average molecular weight (Mn), the molecular weight distribution (Mw/Mn), the peak top molecular weight (Mpi) of the modified conjugated diene-based polymer, the peak top molecular weight ($Mp_2$) of the conjugated diene-based polymer, the ratio therebetween ($Mp_1/Mp_2$), and the ratio of a molecular weight of $200 \times 10^4$ or more and $500 \times 10^4$ or less are obtained. As an eluent, THF (tetrahydrofuran) containing 5 mmol/L of triethylamine is used. As the columns, three columns available under the trade name "TSKgel SuperMultpore HZ-H" produced by Tosoh Corporation are connected to one another, and a guard column available under the trade name "TSKguardcolumn SuperMP (HZ)-H" produced by Tosoh Corporation is connected to the upstream side of these columns. 10 mg of the sample for the measurement is dissolved in 10 mL of THF to obtain a measurement solution, and 10 μL of the measurement solution is injected into the GPC measurement apparatus to perform the measurement under conditions of an oven temperature of 40° C. and a THF flow rate of 0.35 mL/min.

The peak top molecular weights (Mp1 and Mp2) are obtained as follows. On a GPC curve obtained by the measurement, a peak detected as the highest molecular weight component is selected. For the selected peak, the molecular weight corresponding to the maximum value of the peak is calculated and taken to be the peak top molecular weight.

The ratio of a molecular weight of $200\times10^4$ or more and $500\times10^4$ or less is calculated by, based on an integral molecular weight distribution curve, subtracting the ratio occupied, in the whole molecular weight, by a molecular weight less than $200\times10^4$ from the ratio occupied by a molecular weight of $500\times10^4$ or less.

The modified conjugated diene-based polymer (A) contains 0.25 mass % or more and 30 mass % or less of a modified conjugated diene-based polymer having a molecular weight of $200\times10^4$ or more and $500\times10^4$ or less (also referred to as "specific high molecular weight component" herein) with respect to the total amount (100 mass %) of the modified conjugated diene-based polymer. If the content of the specific high molecular weight component is in this range, the low loss property and wet performance of the tire can both be achieved to high levels.

The content of the specific high molecular weight component in the modified conjugated diene-based polymer (A) is preferably 1.0 mass % or more, more preferably 1.4 mass % or more, further preferably 1.75 mass % or more, still more preferably 2.0 mass % or more, particularly preferably 2.15 mass % or more, and extremely preferably 2.5 mass % or more. The content of the specific high molecular weight component in the modified conjugated diene-based polymer (A) is preferably 28 mass % or less, more preferably 25 mass % or less, further preferably 20 mass % or less, and still more preferably 18 mass % or less.

Herein, the "molecular weight" is a standard polystyrene-equivalent molecular weight obtained by gel permeation chromatography (GPC). To obtain the modified conjugated diene-based polymer (A) having the content of the specific high molecular weight component in such a range, it is preferable to control the reaction conditions in the below-described polymerization step and reaction step. For example, in the polymerization step, the use amount of the below-described organomonolithium compound as a polymerization initiator may be adjusted. Moreover, in the polymerization step, a method using a residence time distribution may be used, i.e. the time distribution of growth reaction may be widened, in both continuous polymerization mode and batch polymerization mode.

The molecular weight distribution (Mw/Mn) of the modified conjugated diene-based polymer (A) expressed by the ratio of the weight-average molecular weight (Mw) to the number-average molecular weight (Mn) is preferably 1.6 or more and 3.0 or less. If the molecular weight distribution of the modified conjugated diene-based polymer (A) is in this range, the rubber composition has favorable processability.

A method of producing the modified conjugated diene-based polymer (A) is not limited, but preferably includes: a polymerization step of polymerizing at least a conjugated diene compound to obtain a conjugated diene-based polymer using an organomonolithium compound as a polymerization initiator; and a reaction step of reacting an active end of the conjugated diene-based polymer with a penta- or more functional reactive compound (hereafter also referred to as "coupling agent"). As the coupling agent, it is preferable to cause reaction with a penta- or more functional reactive compound containing a nitrogen atom and a silicon atom.

The modified conjugated diene-based polymer (A) is preferably obtained by reacting a conjugated diene-based polymer with a coupling agent represented by the foregoing General Formula (VI). As a result of using the rubber composition containing the modified conjugated diene-based polymer (A) obtained by reaction with the coupling agent in a tire, the wear resistance performance of the tire can be improved.

In General Formula (VI), the hydrocarbon group represented by A encompasses saturated, unsaturated, aliphatic, and aromatic hydrocarbon groups. The organic group not containing active hydrogen is, for example, an organic group not containing a functional group having active hydrogen such as hydroxyl group (—OH), secondary amino group (>NH), primary amino group (—NH$_2$), and sulfhydryl group (—SH).

The polymerization step is preferably polymerization through growth reaction by living anion polymerization reaction. Thus, a conjugated diene-based polymer having an active end can be obtained, and therefore a modified diene-based polymer (A) with a high modification rate can be obtained.

The conjugated diene-based polymer is obtained by polymerizing at least the conjugated diene compound, and is optionally obtained by copolymerizing the conjugated diene compound and a vinyl-substituted aromatic compound.

The conjugated diene compound is preferably a conjugated diene compound having a carbon number of 4 to 12, and more preferably a conjugated diene compound having a carbon number of 4 to 8. Examples of such a conjugated diene compound include 1,3-butadiene, isoprene, 2,3-dimethyl-1,3-butadiene, 1,3-pentadiene, 3-methyl-1,3-pentadiene, 1,3-hexadiene, and 1,3-heptadiene. Of these, 1,3-butadiene and isoprene are preferable from the viewpoint of industrial availability. One of these conjugated diene compounds may be used individually, or two or more of these conjugated diene compounds may be used together.

The vinyl-substituted aromatic compound is preferably a monovinyl aromatic compound. Examples of the monovinyl aromatic compound include styrene, p-methylstyrene, a-methylstyrene, vinyl ethyl benzene, vinyl xylene, vinyl naphthalene, and diphenyl ethylene. Of these, styrene is preferable from the viewpoint of industrial availability. One of these vinyl-substituted aromatic compounds may be used individually, or two or more of these vinyl-substituted aromatic compounds may be used together.

The use amount of the organomonolithium compound as a polymerization initiator is preferably determined depending on the target molecular weight of the conjugated diene-based polymer or modified conjugated diene-based polymer. The ratio of the use amount of a monomer such as the conjugated diene compound to the use amount of the polymerization initiator relates to the polymerization degree, that is, the number-average molecular weight and/or the weight-average molecular weight. Accordingly, in order to increase the molecular weight, adjustment may be made to reduce the amount of the polymerization initiator, and in order to reduce the molecular weight, adjustment may be made to increase the amount of the polymerization initiator.

The organomonolithium compound is preferably an alkyllithium compound from the viewpoint of industrial availability and controllability of polymerization reaction. Thus, a conjugated diene-based polymer having an alkyl group at a polymerization starting end can be obtained. Examples of the alkyllithium compound include n-butyllithium, sec-butyllithium, tert-butyllithium, n-hexyllithium, benzyllithium, phenyllithium, and stilbenelithium. From the viewpoint of industrial availability and controllability of polymerization reaction, the alkyllithium compound is preferably n-butyllithium or sec-butyllithium. One of these organomonolithium compounds may be used individually, or two or more of these organomonolithium compounds may be used together.

Examples of polymerization reaction modes that can be used in the polymerization step include batch and continuous polymerization reaction modes. In the continuous mode, one reactor or two or more connected reactors may be used. As a reactor for the continuous mode, for example, a tank or tubular reactor equipped with a stirrer is used. It is preferable, in the continuous mode, that a monomer, an inert solvent, and a polymerization initiator are continuously fed to the reactor, a polymer solution containing a polymer is obtained in the reactor, and the polymer solution is continuously discharged. As a reactor for the batch mode, for example, a tank reactor equipped with a stirrer is used. It is preferable, in the batch mode, that a monomer, an inert solvent, and a polymerization initiator are fed, the monomer is continuously or intermittently added during the polymerization if necessary, a polymer solution containing a polymer is obtained in the reactor, and the polymer solution is discharged after completing the polymerization.

In this embodiment, the continuous mode in which a polymer can be continuously discharged to be supplied to the next reaction in a short period of time is preferable in order to obtain a conjugated diene-based polymer having an active end at a high ratio.

In the polymerization step, the polymerization is preferably performed in an inert solvent. Examples of the inert solvent include hydrocarbon-based solvents such as saturated hydrocarbon and aromatic hydrocarbon. Specific examples of the hydrocarbon-based solvent include aliphatic hydrocarbons such as butane, pentane, hexane, and heptane; alicyclic hydrocarbons such as cyclopentane, cyclohexane, methylcyclopentane, and methylcyclohexane;

aromatic hydrocarbons such as benzene, toluene, and xylene; and hydrocarbons which are mixtures thereof. Allenes and acetylenes as impurities are preferably treated with an organic metal compound before the solvent is supplied to the polymerization reaction, because, in this way, a conjugated diene-based polymer having an active end in a high concentration tends to be obtained, and a modified conjugated diene-based polymer having a high modification rate tends to be obtained.

In the polymerization step, a polar compound may be added. By adding the polar compound, an aromatic vinyl compound can be randomly copolymerized with the conjugated diene compound. Moreover, there is a tendency that the polar compound can also be used as a vinylation agent for controlling the microstructure of the conjugated diene portion.

Examples of the polar compound include ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl) propane; tertiary amine compounds such as tetramethylethylenediamine, dipiperidinoethane, trimethylamine, triethylamine, pyridine, and quinuclidine; alkaline metal alkoxide compounds such as potassium-tert-amylate, potassium-tert-butylate, sodium-tert-butylate, and sodium amylate; and phosphine compounds such as triphenylphosphine. One of these polar compounds may be used individually, or two or more of these polar compounds may be used together.

In the polymerization step, the polymerization temperature is preferably 0° C. or more, further preferably 120° C. or less, and particularly preferably 50° C. or more and 100° C. or less, from the viewpoint of productivity. If the polymerization temperature is in this range, a sufficient reaction amount of the coupling agent for the active end after the polymerization end is likely to be ensured.

The amount of bound conjugated diene in the conjugated diene-based polymer or the modified conjugated diene-based polymer (A) is not limited, but is preferably 40 mass % or more and 100 mass % or less, and more preferably 55 mass % or more and 80 mass % or less. The amount of bound aromatic vinyl in the conjugated diene-based polymer or the modified conjugated diene-based polymer (A) is not limited, but is preferably 0 mass % or more and 60 mass % or less, and more preferably 20 mass % or more and 45 mass % or less.

If the amount of bound conjugated diene and the amount of bound aromatic vinyl are in the respective ranges, all of low loss property, wet performance, and wear resistance performance can be achieved to high levels when the rubber composition is used in a tire.

The amount of bound aromatic vinyl can be measured using ultraviolet absorption of a phenyl group, and, based on this, the amount of bound conjugated diene can be obtained. Specifically, the amount is measured as follows: A modified conjugated diene-based polymer is used as a sample. 100 mg of the sample is dissolved in chloroform to be diluted to 100 mL, to obtain a measurement sample. Based on the absorption of a phenyl group of styrene at the ultraviolet absorption wavelength (in the vicinity of 254 nm), the bound styrene content (mass %) with respect to 100 mass % of the sample is measured (spectrophotometer "UV-2450" produced by Shimadzu Corporation).

In the conjugated diene-based polymer or the modified conjugated diene-based polymer (A), the vinyl bond content in a conjugated diene bond unit is not limited, but is preferably 10 mol % or more and 75 mol % or less, and more preferably 20 mol % or more and 65 mol % or less. If the vinyl bond content is in the foregoing range, low loss property, wet performance, and wear resistance performance can all be achieved to high levels when the rubber composition is used in a tire.

In the case where the modified conjugated diene-based polymer (A) is a copolymer of butadiene and styrene, the vinyl bond content (1,2-bond content) in a butadiene bond unit can be obtained by Hampton method (R. R. Hampton, Analytical Chemistry, 21, 923 (1949)). Specifically, the vinyl bond content is measured as follows: A modified conjugated diene-based polymer is used as a sample. 50 mg of the sample is dissolved in 10 mL of carbon disulfide, to obtain a measurement sample. A solution cell is used to measure an infrared spectrum in a range of 600 cm' to 1000 cm', and, in accordance with a calculation formula of the Hampton method based on absorbance at a prescribed wavenumber, the microstructure of a butadiene portion, namely, 1,2-vinyl bond content (mol %), is obtained (Fourier transform infrared spectrophotometer "FT-IR230" produced by JASCO Corporation).

The glass transition temperature (Tg) of the modified conjugated diene-based polymer (A) is preferably more than −50° C., and further preferably −45° C. or more and −15° C. or less. If the glass transition temperature (Tg) of the modified conjugated diene-based polymer (A) is −45° C. or more and −15° C. or less, both low loss property and wet performance can be achieved to higher levels when the rubber composition is used in a tire. The glass transition temperature is defined as a peak top (inflection point) of a DSC differential curve obtained by recording a DSC curve during temperature increase in a predetermined temperature range in accordance with ISO 22768: 2006. Specifically, the glass transition temperature is measured as follows: A modified conjugated diene-based polymer is used as a sample to record a DSC curve in accordance with ISO 22768: 2006 using a differential scanning calorimeter "DSC3200S" produced by MAC Science Co., Ltd. under a flow of helium at 50 mL/min during temperature increase from −100° C. at a rate of 20° C./min, and a peak top (inflection point) of the obtained DSC differential curve is taken to be the glass transition temperature.

The reactive compound (coupling agent) is preferably a penta- or more functional reactive compound containing a nitrogen atom and a silicon atom, and preferably contains at least three silicon-containing functional groups. The coupling agent is more preferably a compound in which at least one silicon atom forms an alkoxy silyl group or silanol group having a carbon number of 1 to 20, and further preferably a compound represented by the foregoing General Formula (VI).

The alkoxy silyl group of the coupling agent tends to react with, for example, the active end of the conjugated diene-based polymer to dissociate alkoxy lithium, thus forming a bond between an end of the conjugated diene-based polymer chain and silicon of the coupling residual group. A value obtained by subtracting the number of SiOR having become nonexistent through the reaction from the total number of SiOR contained in one molecule of the coupling agent corresponds to the number of alkoxy silyl groups contained in the coupling residual group. An azasila cycle group contained in the coupling agent forms a >N—Li bond and a bond between the end of the conjugated diene-based polymer and silicon of the coupling residual group. The >N—Li bond tends to easily change to >NH and LiOH with water or the like used in finishing. Moreover, in the coupling agent, an unreacted residual alkoxy silyl group tends to easily change to silanol (Si—OH group) with water or the like used in finishing.

The reaction temperature in the reaction step is preferably substantially equal to the polymerization temperature of the conjugated diene-based polymer, more preferably 0° C. or more and 120° C. or less, and further preferably 50° C. or more and 100° C. or less. The temperature change after the polymerization step until the addition of the coupling agent is preferably 10° C. or less, and more preferably 5° C. or less.

The reaction time in the reaction step is preferably 10 sec or more, and more preferably 30 sec or more. The time from the end of the polymerization step to the start of the reaction step is preferably shorter, from the viewpoint of the coupling rate. The time from the end of the polymerization step to the start of the reaction step is more preferably 5 min or less.

Mixing in the reaction step may be any of mechanical stirring, stirring with a static mixer, and the like. In the case where the polymerization step is in the continuous mode, the reaction step is preferably in the continuous mode, too. As a reactor used in the reaction step, for example, a tank or tubular reactor equipped with a stirrer is used. The coupling agent may be diluted with an inert solvent and continuously supplied to the reactor. In the case where the polymerization step is in the batch mode, the reaction step may be performed by a method of charging the polymerization reactor with the coupling agent, or a method of transferring the polymer to another reactor.

In General Formula (VI), A is preferably represented by any of the foregoing General Formulas (II) to (V). As a result of A being represented by any of the foregoing General Formulas (II) to (V), the modified conjugated diene-based polymer (A) has better performance.

For $B^1$, $B^2$, $B^4$, and $B^5$ in General Formulas (II) to (V), the hydrocarbon group having a carbon number of 1 to 20 is, for example, an alkylene group having a carbon number of 1 to 20.

Preferably, in General Formula (VI), A is represented by General Formula (II) or (III), and k represents 0.

More preferably, in General Formula (VI), A is represented by General Formula (II) or (III) and k represents 0, and, in General Formula (II) or (III), a represents an integer of 2 to 10.

Still more preferably, in General Formula (VI), A is represented by General Formula (II) and k represents 0, and, in General Formula (II), a represents an integer of 2 to 10.

Examples of such a coupling agent include bis(3-trimethoxysilylpropyl)-[3-(2,2-dimethoxy-1-aza-2-silacyclopentane)propyl]amine, tris (3-trimethoxysilylpropyl) amine, tris(3-triethoxysilylpropyl) amine, tris(3-trimethoxysilylpropyl)-[3-(2,2-dimethoxy-1-aza-2-silacyclopentane) propyl]-1,3-propanediamine, tetrakis [3-(2,2-dimethoxy-1-aza-2-silacyclopentane)propyl]-1,3-propanediami ne, tetrakis(3-trimethoxysilylpropyl)-1,3 -propanediamine, tetrakis(3-trimethoxysilylpropyl)-1,3-bisaminomethylcyclohexane, tris(3-trimethoxysilylpropyl)-methyl-1,3-propanediamine, and bis[3-(2,2-dimethoxy-1-aza-2-silacyclopentane)propyl]-(3-trismethoxysilylpropyl)-methyl-1,3-propanediamine. Of these, tetrakis [3-(2,2-dimethoxy- 1-aza-2-silacyclopentane)propyl]-1,3-propanediami ne, tetrakis(3-trimethoxysilylpropyl)-1,3-propanediamine, and tetrakis(3-trimethoxysilylpropyl)-1,3-bisaminomethylcyclohexane are particularly preferable.

The addition amount of the compound represented by General Formula (VI) as the coupling agent can be adjusted so that the reaction is performed with the mole number ratio between the conjugated diene-based polymer and the coupling agent being set to a desired stoichiometric ratio. This is likely to achieve a desired branching degree. Specifically, the mole number of the polymerization initiator with respect to the mole number of the coupling agent is preferably 5.0-fold mole or more, and more preferably 6.0-fold mole or more. In this case, in General Formula (VI), the number of functional groups in the coupling agent ((m−1)×i+p×j+k) is preferably an integer of 5 to 10, and more preferably an integer of 6 to 10.

To obtain the modified conjugated diene-based polymer (A) containing the specific high molecular weight component, the molecular weight distribution (Mw/Mn) of the conjugated diene-based polymer is preferably 1.5 or more and 2.5 or less, and more preferably 1.8 or more and 2.2 or less. A single peak is preferably detected in the molecular weight curve of the resultant modified conjugated diene-based polymer (A) obtained by GPC.

When the peak molecular weight of the modified conjugated diene-based polymer (A) obtained by GPC is denoted by $Mp_1$ and the peak molecular weight of the conjugated diene-based polymer is denoted by $Mp_2$, the following formula preferably holds:

$(Mp_1/Mp_2) < 1.8 \times 10 - 12 \times (Mp_2 - 120 \times 10^4)^2 + 2.$

More preferably, $Mp_2$ is $20 \times 10^4$ or more and $80 \times 10^4$ or less, and $Mp_1$ is $30 \times 10^4$ or more and $150 \times 10^4$ or less.

The modification rate of the modified conjugated diene-based polymer (A) is preferably 30 mass % or more, more preferably 50 mass % or more, and further preferably 70 mass % or more. If the modification rate is 30 mass % or more, when the rubber composition is used in a tire, the low loss property of the tire can be further improved while improving the wear resistance performance of the tire.

The modification rate is measured as follows: A modified conjugated diene-based polymer is used as a sample to perform measurement by applying a property that a modified basic polymer component adsorbs to a GPC column using a silica-based gel as a filler. A chromatogram obtained by measurement using a polystyrene-based column and a chromatogram obtained by measurement using a silica-based column are obtained by using a sample solution containing the sample and low molecular weight internal standard polystyrene, and, based on the difference between these chromatograms, the adsorption amount to the silica-based column is measured to obtain the modification rate. Specifically, the measurement is performed as described below.

Preparation of sample solution: 10 mg of the sample and 5 mg of standard polystyrene are dissolved in 20 mL of THF to obtain a sample solution.

GPC measurement conditions using polystyrene-based column: An apparatus available under the trade name "HLC-8320GPC" produced by Tosoh Corporation is used, THF containing 5 mmol/L of triethylamine is used as an eluent, and 10 µL of the sample solution is injected into the apparatus to obtain a chromatogram by using an RI detector under conditions of a column oven temperature of 40° C. and a THF flow rate of 0.35 mL/min. Three columns available under the trade name "TSKgel SuperMultiporeHZ-H" produced by Tosoh Corporation are connected to one another, and a guard column available under the trade name "TSKguardcolumn SuperMP(HZ)-H" produced by Tosoh Corporation is connected to the upstream side of these columns.

GPC measurement conditions using silica-based column: An apparatus available under the trade name of "HLC-8320GPC" produced by Tosoh Corporation is used, THF is used as an eluent, and 50 µL of the sample solution is injected into the apparatus to obtain a chromatogram by using an RI detector under conditions of a column oven temperature of 40° C. and a THF flow rate of 0.5 ml/min. Columns available under the trade names "Zorbax PSM-1000S", "PSM-300S" and "PSM-60S" are connected to one another, and a guard column available under the trade name "DIOL 4.6×12.5 mm 5 micron" is connected to the upstream side of these columns.

Calculation method for modification rate: Assuming that the whole peak area is 100, the peak area of the sample is P1, and the peak area of standard polystyrene is P2 in the chromatogram obtained using the polystyrene-based column, and that the whole peak area is 100, the peak area of the sample is P3, and the peak area of standard polystyrene is P4 in the chromatogram obtained using the silica-based column, the modification rate (%) is obtained according to the following formula:

modification rate(%)=[1−(P2×P3)/(P1×P4)]×100

(where P1+P2=P3+P4=100).

After the reaction step, a deactivator, a neutralizer, and the like may be optionally added to the copolymer solution. Examples of the deactivator include, but are not limited to, water; and alcohols such as methanol, ethanol, and isopropanol. Examples of the neutralizer include, but are not limited to, carboxylic acids such as stearic acid, oleic acid, and versatic acid (a mixture of highly branched carboxylic acids having a carbon number of 9 to 11, mainly a carbon number of 10); and an aqueous solution of an inorganic acid, and a carbon dioxide gas.

From the viewpoint of preventing gel formation after the polymerization and improving stability in processing, an antioxidant is preferably added to the modified conjugated diene-based polymer (A). Examples of the antioxidant include 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol.

To further improve the processability of the modified conjugated diene-based polymer (A), an extender oil may be optionally added to the modified conjugated diene-based copolymer. The method of adding an extender oil to the modified conjugated diene-based polymer is preferably, but is not limited to, a method by which an extender oil is added to the polymer solution and mixed, and the resultant oil-extended copolymer solution is desolvated. Examples of the extender oil include aroma oil, naphthenic oil, and paraffin oil. Of these, from the viewpoint of environmental safety, oil bleeding prevention, and wet performance, aroma-alternative oil containing 3 mass % or less of a polycyclic aromatic (PCA) component according to the IP 346 is preferable. Examples of the aroma-alternative oil include TDAE (Treated Distillate Aromatic Extracts), MES (Mild Extraction Solvate), and the like described in Kautschuk Gummi Kunststoffe 52 (12) 799 (1999), and RAE (Residual Aromatic Extracts). The addition amount of the extender oil is not limited, but is preferably 10 parts to 60 parts by mass and more preferably 20 parts to 37.5 parts by mass with respect to 100 parts by mass of the modified conjugated diene-based polymer (A).

As the method of collecting the modified conjugated diene-based polymer (A) from the polymer solution, any known method may be used. Examples of the method include a method by which the polymer is filtered off after separating the solvent by steam stripping and the resultant is dehydrated and dried to collect the polymer, a method by which the solution is concentrated in a flashing tank and the resultant is devolatilized by a vent extruder or the like, and a method by which the solution is directly devolatilized using a drum dryer or the like.

The modified conjugated diene-based polymer (A) obtained by the reaction between the coupling agent represented by the foregoing General Formula (VI) and the conjugated diene-based polymer is, for example, represented by the foregoing General Formula (I).

In General Formula (I), D represents a conjugated diene-based polymer chain, and the weight-average molecular weight of the conjugated diene-based polymer chain is preferably $10 \times 10^4$ to $100 \times 10^4$. The conjugated diene-based polymer chain is a structural unit of the modified conjugated diene-based polymer, and is, for example, a conjugated diene-based polymer-derived structural unit obtained by the reaction between the conjugated diene-based polymer and the coupling agent.

In General Formula (I), the hydrocarbon group represented by A encompasses saturated, unsaturated, aliphatic, and aromatic hydrocarbon groups. The organic group not containing active hydrogen is, for example, an organic group not containing a functional group having active hydrogen such as hydroxyl group (—OH), secondary amino group (>NH), primary amino group (—NH$_2$), and sulfhydryl group (—SH).

Preferably, in General Formula (I), A is represented by General Formula (II) or (III), and k represents 0.

More preferably, in General Formula (I), A is represented by General Formula (II) or (III) and k represents 0, and, in General Formula (II) or (III), a represents an integer of 2 to 10.

Still more preferably, in General Formula (I), A is represented by General Formula (II) and k represents 0, and, in General Formula (II), a represents an integer of 2 to 10.

The content of the modified conjugated diene-based polymer (A) in the rubber component is preferably 25 mass % to 40 mass %, and further preferably 30 mass % to 35 mass %. If the content of the modified conjugated diene-based polymer (A) in the rubber component is 25 mass % or more, when the rubber composition is used in a tire, the wet performance of the tire can be further improved. If the content of the modified conjugated diene-based polymer (A) in the rubber component is 40 mass % or less, the processability of the rubber composition is improved.

The rubber component in the present disclosure may be a modified SBR other than the modified conjugated diene-based polymer (A), or an unmodified SBR. Examples of the other modified SBR include a modified (co)polymer as a polymer component P2 and a modified polymer C and a modified polymer D described in the examples section in WO 2017/077712 A1.

<Styrene-Alkylene Block Copolymer>

The styrene-alkylene block copolymer is a copolymer having a styrene-based monomer-derived block and an alkylene block. In the styrene-alkylene block copolymer in the rubber composition according to the present disclosure, the total styrene content of the styrene-alkylene block copolymer is 30 mass % or more with respect to the total mass of the styrene-alkylene block copolymer. The styrene-alkylene block copolymer may be used alone or in combination of two or more thereof.

The total styrene content of the styrene-alkylene block copolymer (the total content of the styrene-based monomer-derived block) may be adjusted as appropriate, as long as it is 30 mass % or more. For example, the total styrene content of the styrene-alkylene block copolymer is 30 mass % or more or 40 mass % or more, and 60 mass % or less.

In the rubber composition according to the present disclosure, the total styrene content is preferably 50 mass % or more with respect to the total mass of the styrene-alkylene block copolymer. This can further enhance dry handling performance.

In the present disclosure, the styrene content and the content of the blow-described alkylene unit in the styrene-alkylene block copolymer are determined by an integral ratio of $^1$H-NMR.

The styrene block of the styrene-alkylene block copolymer has a unit derived from a styrene-based monomer (i.e. resulting from polymerization of a styrene-based monomer). Examples of the styrene-based monomer include styrene, a-methylstyrene, p-methylstyrene, and vinyltoluene. Of these, styrene is preferable as the styrene-based monomer.

The alkylene block of the styrene-alkylene block copolymer has an alkylene (divalent saturated hydrocarbon group) unit. Examples of the alkylene unit include an alkylene group having a carbon number of 1 to 20. The alkylene unit may be a linear structure, a branched structure, or a combination thereof. Examples of the alkylene unit of linear structure include a —(CH$_2$—CH$_2$)— unit (ethylene unit) and a —(CH$_2$—CH$_2$—CH$_2$—CH$_2$)— unit (butylene unit). Examples of the alkylene unit of branched structure include a —(CH$_2$—CH(C$_2$H$_5$))— unit (butylene unit). Of these, a —(CH$_2$—CH(C$_2$H$_5$))— unit is preferable as the alkylene unit.

The total content of the alkylene unit may be adjusted as appropriate. For example, the total content of the alkylene unit is 40 mass % to 60 mass % with respect to the total mass of the styrene-alkylene block copolymer.

In the rubber composition according to the present disclosure, the alkylene block of the styrene-alkylene block copolymer has a —(CH$_2$—CH(C$_2$H$_5$))— unit (A) and a —(CH$_2$—CH$_2$)— unit (B), and the total content of the unit (A) is preferably 40 mass % or more, more preferably 50 mass % or more, and further preferably 65 mass % or more, with respect to the total mass of the whole alkylene block (unit (A) and unit (B)). The total content of the unit (A) is preferably 90 mass % or less, more preferably 85 mass % or less, and further preferably 80 mass % or less, with respect to the total mass of the whole alkylene block (unit (A) and unit (B)).

Thus, both wet performance and low loss property can be achieved while delivering excellent dry handling performance.

In an example of the rubber composition according to the present disclosure, the styrene-alkylene block copolymer is one or more selected from the group consisting of a styrene-ethylenebutylene-styrene block copolymer (SEBS), a styrene-ethylenepropylene-styrene block copolymer (SEPS), and a styrene-ethylene/ethylenepropylene-styrene block copolymer (SEEPS).

In the rubber composition according to the present disclosure, the styrene-alkylene block copolymer is preferably a styrene-ethylenebutylene-styrene block copolymer.

Thus, both wet performance and low loss property can be achieved while delivering excellent dry handling performance. The ethylenebutylene block of the styrene-ethylenebutylene-styrene block copolymer is a block having the foregoing ethylene unit and butylene unit.

The styrene-alkylene block copolymer may contain other structural units besides the foregoing styrene block and alkylene block. Examples of the other structural units include a structural unit having an unsaturated bond such as a —(CH$_2$—CH(CH═CH$_2$))— unit.

The preparation method for the styrene-alkylene block copolymer is not limited, and may be a commonly known method. For example, the styrene-alkylene block copolymer can be obtained by copolymerizing a styrene-based monomer such as styrene and a conjugated diene compound such as 1,3-butadiene or an olefin such as butane to obtain a precursor copolymer and hydrogenating the precursor copolymer.

The styrene-alkylene block copolymer may be a commercial product. Examples of the commercial product include JSR DYNARON® 9901P produced by JSR Corporation (DYNARON is a registered trademark in Japan, other countries, or both).

The blending amount of the styrene-alkylene block copolymer in the rubber composition is not limited, and may be adjusted as appropriate. For example, the blending amount of the styrene-alkylene block copolymer is 4 parts to 30 parts by mass with respect to 100 parts by mass of the rubber component. From the viewpoint of achieving both wet performance and low loss property while delivering excellent dry handling performance, the blending amount of the styrene-alkylene block copolymer is preferably 8.5 parts to 30 parts by mass with respect to 100 parts by mass of the rubber component.

The rubber composition according to the present disclosure may further comprise, in addition to the rubber component and the styrene-alkylene block copolymer, one or more selected from the group consisting of a filler, a silane coupling agent, a thermoplastic resin, a vulcanization accelerator, a vulcanizing agent, and a glycerin fatty acid ester.

<Filler>

Examples of the filler include silica, carbon black, aluminum oxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate. One of these fillers may be used individually, or two or more of these fillers may be used in combination.

From the viewpoint of reinforcement and low loss property, the filler preferably contains silica.

The silica is not limited, and may be selected as appropriate depending on the purpose. Examples include wet silica (hydrous silicate), dry silica (anhydrous silicate), calcium silicate, and aluminum silicate.

The wet silica may be wet silica whose specific surface area by cetyltrimethylammonium bromide adsorption (CTAB) and ink bottle-shaped micropore index (IB) measured by a mercury porosimeter satisfy the following Formula (Y) described in JP 2013-245306 A:

$$IB \leq -0.36 \times CTAB + 86.8 \qquad (Y).$$

The CTAB of the wet silica may be adjusted as appropriate, and is, for example, 40 m$^2$/g to 300 m$^2$/g.

The BET specific surface area of the wet silica may be adjusted as appropriate, and is, for example, 40 m$^2$/g to 350 m$^2$/g, 150 m$^2$/g to 280 m$^2$/g, 190 m$^2$/g to 275 m$^2$/g, or 220 m$^2$/g to 270 m$^2$/g.

Preferably, the rubber composition according to the present disclosure further contains wet silica, the specific surface area by cetyltrimethylammonium bromide adsorption (CTAB) of the wet silica is 40 m$^2$/g to 300 m$^2$/g, and the BET specific surface area of the wet silica is 40 m$^2$/g to 350 m$^2$/g.

Thus, the effects of dry handling performance and low loss property can be achieved.

The amount of the silica in the filler is not limited, and may be adjusted as appropriate depending on the purpose. The amount of the silica is preferably 50 mass % to 100 mass %, more preferably 80 mass % to 100 mass %, and particularly preferably 90 mass % to 100 mass %, with respect to the total mass of the filler.

The carbon black is not limited, and examples include high, medium, or low-structure SAF, ISAF, ISAF-HS, IISAF, N339, HAF, FEF, GPF, SRF-grade carbon blacks.

The blending amount of the filler is not limited, and may be adjusted as appropriate. For example, the blending amount of the filler is 20 parts to 120 parts by mass with respect to 100 parts by mass of the rubber component. From the viewpoint of low loss property and wet performance, the blending amount of the filler is preferably 50 parts to 100 parts by mass with respect to 100 parts by mass of the rubber component.

<Silane Coupling Agent>

The use of the silane coupling agent contributes to better operability during rubber processing, and enables production of a tire having better wear resistance performance. The silane coupling agent may be used alone or in combination of two or more thereof.

The silane coupling agent is not limited, and may be selected as appropriate depending on the purpose. Examples include a compound represented by Formula (I): $(R^1O)_{3-p}(R^2)_pSi-R^3-1S_a-R^3-Si(OR^1)_{3-r}(R^2)_r$, and a compound represented by Formula (II): $(R^4O)_{3-s}(R^5)_sSi-R^6-S_k-R^7-S_k-R^6-Si(OR^4)_{3-t}(R^5)_t$.

In Formula (I), $R^1$ are each independently a linear, cyclic, or branched alkyl group having a carbon number of 1 to 8, a linear or branched alkoxyalkyl group having a carbon number of 2 to 8, or a hydrogen atom, $R^2$ are each independently a linear, cyclic, or branched alkyl group having a carbon number of 1 to 8, and $R^3$ are each independently a linear or branched alkylene group having a carbon number of 1 to 8. Moreover, a is 2 to 6 as an average value, and p and r may be the same or different, and are each 0 to 3 as an average value, where p and r are not both 3.

In Formula (II), $R^4$ are each independently a linear, cyclic, or branched alkyl group having a carbon number of 1 to 8, a linear or branched alkoxyalkyl group having a carbon number of 2 to 8, or a hydrogen atom, $R^5$ are each independently a linear, cyclic, or branched alkyl group having a carbon number of 1 to 8, and $R^6$ are each independently a linear or branched alkylene group having a carbon number of 1 to 8. $R^7$ is a divalent group of any of general formulas ($-S-R^8-S-$), ($-R^9-S_{m1}-R^{10}-$), and ($-R^{11}-S_{m2}-R^{12}-S_{m3}-R^{13}-$) ($R^8$ to $R^{13}$ are each a divalent hydrocarbon group having a carbon number of 1 to 20, a divalent aromatic group having a carbon number of 1 to 20, or a divalent organic group having a carbon number of 1 to 20 and containing a hetero element other than sulfur and oxygen, and m1, m2 and m3 may be the same or different, and are each 1 or more and less than 4 as an average value), k are each independently 1 to 6 an average value, and s and t are each 0 to 3 as an average value, where s and t are not both 3.

Examples of the silane coupling agent represented by Formula (I) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, and bis(2-monoethoxydimethylsilylethyl)disulfide.

Examples of the silane coupling agent represented by Formula (II) include silane coupling agents having average compositional formula $(CH_3CH_2O)_3Si-(CH_2)_3-S_2-(CH_2)_6-S_2-(CH_2)_3-Si(OCH_2CH_3)_3$, average compositional formula $(CH_3CH_2O)_3Si-(CH_2)_3-S_2-(CH_2)_{10}-S_2-(CH_2)_3-Si(OCH_2CH_3)_3$, average compositional formula $(CH_3CH_2O)_3Si-(CH_2)_3-S_3-(CH_2)_6-S_3-(CH_2)_3-Si(OCH_2CH_3)_3$, average compositional formula $(CH_3CH_2O)_3Si-(CH_2)_3-S_4-(CH_2)_6-S_4-(CH_2)_3-Si(OCH_2CH_3)_3$, average compositional formula $(CH_3CH_2O)_3Si-(CH_2)_3-S-(CH_2)_6-S_2-(CH_2)_6-S-(CH_2)_3-Si(OCH_2CH_3)_3$, average compositional formula $(CH_3CH_2O)_3$ Si—(CH$_2$)$_3$—S—(CH$_2$)$_6$—S$_{2.5}$—(CH$_2$)$_6$—S—(CH$_2$)$_3$—Si(OCH$_2$CH$_3$)$_3$, average compositional formula (CH$_3$CH$_2$O)$_3$Si—(CH$_2$)$_3$—S—(CH$_2$)$_6$—S$_3$—(CH$_2$)$_6$—S—(CH$_2$)$_3$—Si(OCH$_2$CH$_3$)$_3$, average compositional formula (CH$_3$CH$_2$O)$_3$Si—(CH$_2$)$_3$—S—(CH$_2$)$_6$—S$_4$—(CH$_2$)$_6$—S—(CH$_2$)$_3$—Si(OCH$_2$CH$_3$)$_3$, average compositional formula (CH$_3$CH$_2$O)$_3$Si—(CH$_2$)$_3$—S—(CH$_2$)$_{10}$—S$_2$—(CH$_2$)$_{10}$—S—(CH$_2$)$_3$—Si(OCH$_2$CH$_3$)$_3$, average compositional formula (CH$_3$CH$_2$O)$_3$Si—(CH$_2$)$_3$—S$_4$—(CH$_2$)$_6$—S$_4$—(CH$_2$)$_6$—S$_4$—(CH$_2$)$_3$—Si(OCH$_2$CH$_3$)$_3$, average compositional formula (CH$_3$CH$_2$O)$_3$Si—(CH$_2$)$_3$—S$_2$—(CH$_2$)$_6$—S$_2$—(CH$_2$)$_6$—S$_2$—(CH$_2$)$_3$—Si(OCH$_2$CH$_3$)$_3$, and average compositional formula (CH$_3$CH$_2$O)$_3$Si—(CH$_2$)$_3$—S—(CH$_2$)$_6$—S$_2$—(CH$_2$)$_6$—S$_2$—(CH$_2$)$_6$—S—(CH$_2$)$_3$—Si(OCH$_2$CH$_3$)$_3$.

Examples of the silane coupling agent include Si363 (ethoxy(3-mercaptopropyl)bis(3,6,9,12,15-pentaoxaocta-cosane-1-yloxy)silane, [C$_{13}$H$_{27}$O(CH$_2$CH$_2$O)$_5$]$_2$(CH$_3$CH$_2$O)Si(CH$_2$)$_3$SH) produced by Evonik Japan Co., Ltd.

The blending amount of the silane coupling agent may be adjusted as appropriate, and is, for example, 1 part by mass or more with respect to 100 parts by mass of the silica. From the viewpoint of improving the reactivity of the silica, the blending amount of the silane coupling agent is preferably 1 to 20 parts by mass with respect to 100 parts by mass of the silica.

<Thermoplastic Resin>

The rubber composition according to the present disclosure may further comprise, in addition to the rubber component and the styrene-alkylene block copolymer, for example, a thermoplastic resin selected from the group consisting of a C$_5$-based resin, a C$_5$-C$_9$-based resin, a C$_9$-based resin, a terpene-based resin, a terpene-aromatic compound-based resin, a rosin-based resin, a dicyclopentadiene resin, an alkylphenol-based resin, and their partially hydrogenated resins. One of these thermoplastic resins may be used individually, or two or more of these thermoplastic resins may be used in combination.

The blending amount of the thermoplastic resin is not limited, and may be adjusted as appropriate depending on the purpose. For example, the blending amount of the thermoplastic resin is 5 parts to 50 parts by mass with respect to 100 parts by mass of the rubber component.

—C$_5$-Based Resin—

The C$_5$-based resin refers to a C$_5$-based synthetic petroleum resin, and denotes a resin obtained by polymerizing a C$_5$ fraction using a Friedel-Crafts catalyst such as AlCl$_3$ or BF$_3$. Specific examples include a copolymer having isoprene, cyclopentadiene, 1,3-pentadiene, 1-pentene, etc. as main components, a copolymer of 2-pentene and dicyclopentadiene, and a polymer mainly composed of 1,3-pentadiene.

—C$_5$-C9-Based Resin—

The C$_5$-C$_9$-based resin refers to a C$_5$-C$_9$-based synthetic petroleum resin, and denotes a resin obtained by polymerizing a C$_5$-C$_{11}$ fraction using a Friedel-Crafts catalyst such as AlCl$_3$ or BF$_3$. Examples include a copolymer having styrene, vinyltoluene, a-methylstyrene, indene, etc. as main components. Of these, a C$_5$-C$_9$-based resin with little C$_9$ or higher component is preferable because it has excellent compatibility with the rubber component. Specifically, a C$_5$-C$_9$-based resin in which the proportion of C$_9$ or higher component is less than 50 mass % is preferable, and a C$_5$-C$_9$-based resin in which the proportion of C$_9$ or higher component is 40 mass % or less is more preferable. Other examples include their partially hydrogenated resins (for example, ARKON® produced by Arakawa Chemical Industries, Ltd. (ARKON is a registered trademark in Japan, other countries, or both)).

—C$_9$-Based Resin—

The C$_9$-based resin refers to a C$_9$-based synthetic petroleum resin, and denotes a resin obtained by polymerizing a C$_9$ fraction using a Friedel-Crafts catalyst such as AlCl$_3$ or BF$_3$. Examples include a copolymer having indene, methylindene, a-methylstyrene, vinyltoluene, etc. as main components.

Other examples include their partially hydrogenated resins (for example, ARKON® produced by Arakawa Chemical Industries, Ltd.).

—Terpene-Based Resin—

The terpene-based resin can be obtained by polymerization, using a Friedel-Crafts catalyst, of turpentine oil obtained simultaneously when obtaining rosin from Pinus trees or a polymerization component separated from the turpentine oil. Examples include β-pinene resin and a-pinene resin.

—Terpene-Aromatic Compound-Based Resin—

The terpene-aromatic compound-based resin can be obtained using a method by which terpenes and various phenols are reacted by using a Friedel-Crafts catalyst, or further condensed with formalin. Examples include terpene-phenol resins. Of the terpene-phenol resins, a terpene-phenol resin in which the proportion of phenol component is less than 50 mass % is preferable, and a terpene-phenol resin in which the proportion of phenol component is 40 mass % or less is more preferable.

The terpenes of the raw material are not limited, and may be selected as appropriate depending on the purpose. Examples include monoterpene hydrocarbons such as a-pinene and limonene. Of these, terpenes containing α-pinene are preferable, and a-pinene is more preferable.

—Rosin-Based Resin—

The rosin-based resin is not limited, and may be selected as appropriate depending on the purpose. Examples include natural resin rosins such as gum rosin, tall oil rosin, and wood rosin contained in raw rosin or tall oil; modified rosins; and modified rosin derivatives. Specific examples of the modified rosin derivatives include polymerized rosin and its partially hydrogenated rosin; glycerin ester rosin and its partially hydrogenated rosin or completely hydrogenated rosin; and pentaerythritol ester rosin and its partially hydrogenated rosin or completely hydrogenated rosin.

—Dicyclopentadiene Resin—

The dicyclopentadiene resin can be obtained by polymerizing dicyclopentadiene using a Friedel-Crafts catalyst such as AlCl$_3$ or BF$_3$. Specific examples of commercial products of the dicyclopentadiene resin include QUINTONE 1920 (produced by Zeon Corporation), QUINTONE 1105 (produced by Zeon Corporation), and MARUKAREZ M-890A (produced by Maruzen Petrochemical Co., Ltd.).

—Alkylphenol-Based Resin—

The alkylphenol-based resin is not limited, and may be selected as appropriate depending on the purpose. Examples include an alkylphenol-acetylene resin such as a p-tert-butylphenol-acetylene resin, and an alkylphenol-formaldehyde resin having a low degree of polymerization.

The rubber composition according to the present disclosure preferably further comprises the thermoplastic resin. This can improve wet performance.

<Vulcanization Accelerator>

The rubber composition according to the present disclosure preferably comprises, in addition to the rubber component and the styrene-alkylene block copolymer, a vulcanization accelerator. For example, the vulcanization accelerator is at least one selected from guanidines, sulfenamides, thiazoles, thiourea, and diethylthiourea. One of these vulcanization accelerators may be used individually, or two or more of these vulcanization accelerators may be used in combination.

The blending amount of the vulcanization accelerator is not limited, and may be adjusted as appropriate depending on the purpose. For example, the blending amount of the vulcanization accelerator is 0.1 parts to 20 parts by mass with respect to 100 parts by mass of the rubber component. As a result of the blending amount of the vulcanization accelerator being 0.1 parts by mass or more, the effect of vulcanization is facilitated. As a result of the blending amount of the vulcanization accelerator being 20 parts by mass or less, excessive progress of vulcanization can be suppressed.

Guanidines, sulfenamides, thiazoles, thiourea, and diethylthiourea function as vulcanization accelerators in the case where, in the blow-described kneading stage B (production stage), they are kneaded with the kneaded product obtained from the blow-described kneading stage A (non-production stage), and additionally function as an activator for enhancing the coupling function of the silane coupling agent to the silica as a result of being kneaded with the silica and the silane coupling agent in the kneading stage A.

—Guanidines—

The guanidines are not limited, and may be selected as appropriate depending on the purpose. Examples include 1,3-diphenylguanidine, 1,3-di-o-tolylguanidine, 1-o-tolylbiguanide, dicatechol borate di-o-tolylguanidine salt, 1,3-di-o-cumenylguanidine, 1,3-di-o-biphenylguanidine, and 1,3-di-o-cumenyl-2-propionylguanidine. Of these, from the viewpoint of high reactivity, 1,3-diphenylguanidine, 1,3-di-o-tolylguanidine, and 1-o-tolylbiguanide are preferable, and 1,3-diphenylguanidine is more preferable.

—Sulfenamides—

The sulfenamides are not limited, and may be selected as appropriate depending on the purpose. Examples include N-cyclohexyl-2-benzothiazolesulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulfenamide, N,N-dimethyl-2-benzothiazolylsulfenamide, N,N-diethyl-2-benzothiazolylsulfenamide, N,N-dipropyl-2-benzothiazolylsulfenamide, N,N-dibutyl-2-benzothiazolylsulfenamide, N,N-dipentyl-2-benzothiazolylsulfenamide, N,N-dihexyl-2-benzothiazolylsulfenamide, N,N-dioctyl-2-benzothiazolylsulfenamide, N,N-di-2-ethylhexylbenzothiazolylsulfenamide, N,N-didodecyl-2-benzothiazolylsulfenamide, and N,N-distearyl-2-benzothiazolylsulfenamide. Of these, from the viewpoint of high reactivity, N-cyclohexyl-2-benzothiazolylsulfenamide and N-tert-butyl-2-benzothiazolylsulfenamide are preferable.

—Thiazoles—

The thiazoles are not limited, and may be selected as appropriate depending on the purpose. Examples include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio) benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, and 6-amino-2-mercaptobenzothiazole. Of these, from the viewpoint of high reactivity, 2-mercaptobenzothiazole and di-2-benzothiazolyl disulfide are preferable.

—Thiourea—

The thiourea is a compound represented by $NH_2CSNH_2$.

—Diethylthiourea—The diethylthiourea is a compound represented by $C_2H_5NHCSNHC_2H_5$.

<Vulcanizing Agent>

The vulcanizing agent is not limited, and may be selected as appropriate depending on the purpose. Examples include sulfur. The vulcanizing agent may be used alone or in combination of two or more thereof.

The blending amount of the vulcanizing agent is not limited, and may be adjusted as appropriate depending on the purpose. The blending amount of the vulcanizing agent is, for example, 0.1 parts to 2.0 parts by mass, more preferably 1.0 part to 2.0 parts by mass, and particularly preferably 1.2 parts to 1.8 parts by mass, with respect to 100 parts by mass of the rubber component.

In the case where the rubber composition according to the present disclosure contains silica as a filler, the rubber composition according to the present disclosure preferably further contains a glycerin fatty acid ester composition containing a glycerin fatty acid ester that is an ester of glycerin and two or more kinds of fatty acids, wherein the most fatty acid component of the two or more kinds of fatty acids constituting the glycerin fatty acid ester accounts for 10 mass % to 90 mass % in the whole fatty acids, and the glycerin fatty acid ester further contains 50 mass % to 100 mass % of a monoester component. In the case where the rubber composition contains the glycerin fatty acid ester composition, the processability of the rubber composition can be improved. As a result of using such a rubber composition in a tire, the low loss property of the tire can be further improved.

The glycerin fatty acid ester is an ester of glycerin and two or more kinds of fatty acids. The "glycerin fatty acid ester" herein is a compound obtained by subjecting at least one of three OH groups of glycerin to ester bond with a COOH group of fatty acid.

The glycerin fatty acid ester may be any of a glycerin fatty acid monoester (monoester component) obtained by esterification of one molecule of glycerin and one molecule of fatty acid, a glycerin fatty acid diester (diester component) obtained by esterification of one molecule of glycerin and two molecules of fatty acid, a glycerin fatty acid triester (triester component) obtained by esterification of one molecule of glycerin and three molecules of fatty acid, and any mixture thereof, but a glycerin fatty acid monoester is preferable. In the case where the glycerin fatty acid ester is a mixture of a glycerin fatty acid monoester, a glycerin fatty acid diester, and a glycerin fatty acid triester, the content of each ester can be measured by gel permeation chromatography (GPC). The two fatty acids constituting the glycerin fatty acid diester may be the same or different, and the three fatty acids constituting the glycerin fatty acid triester may be the same or different.

The glycerin fatty acid ester is an ester of glycerin and two or more kinds of fatty acids. The glycerin fatty acid ester may be a glycerin fatty acid diester or a glycerin fatty acid triester obtained by esterification of two or more kinds of fatty acids and one molecule of glycerin, but is preferably a mixture of a glycerin fatty acid monoester obtained by esterification of one molecule of glycerin and one molecule of one kind of fatty acid from among the two or more kinds of fatty acids and a glycerin fatty acid monoester obtained by esterification of one molecule of glycerin and one molecule of another kind of fatty acid.

As the two or more kinds of fatty acids as raw materials of the glycerin fatty acid ester (i.e. the constituent fatty acids of the glycerin fatty acid ester), a fatty acid having a carbon number of 8 to 22 is preferable, a fatty acid having a carbon number of 12 to 18 is more preferable, a fatty acid having a carbon number of 14 to 18 is further preferable, and a fatty acid having a carbon number of 16 and a fatty acid having a carbon number of 18 are even more preferable, from the viewpoint of the processability, low loss property, and breaking resistance of the rubber composition. More preferably, of the two or more kinds of fatty acids as raw materials of the glycerin fatty acid ester, one of the most fatty acid component and the second most fatty acid component is a fatty acid having a carbon number of 16 and the other one of the most fatty acid component and the second most fatty acid component is a fatty acid having a carbon number of 18.

In the case where the glycerin fatty acid ester is an ester of glycerin and a fatty acid having a carbon number of 16 and a fatty acid having a carbon number of 18, the mass ratio between the fatty acid having a carbon number of 16 and the fatty acid having a carbon number of 18 (the fatty acid having a carbon number of 16 / the fatty acid having a carbon number of 18) is preferably in a range of 90/10 to 10/90, more preferably in a range of 80/20 to 20/80, and further preferably in a range of 75/25 to 25/75. If the mass ratio between the fatty acid having a carbon number of 16 and the fatty acid having a carbon number of 18 is in this range, the processability, low loss property, and breaking resistance of the rubber composition can be further improved.

Each constituent fatty acid of the glycerin fatty acid ester may be linear or branched, but is preferably linear. Each constituent fatty acid may be a saturated fatty acid or an unsaturated fatty acid, but is preferably a saturated fatty acid.

Specific examples of the constituent fatty acids of the glycerin fatty acid ester include caprylic acid, pelargonic acid, capric acid, lauric acid, myristic acid, palmitic acid, stearic acid, isostearic acid, oleic acid, linoleic acid, linolenic acid, arachic acid, arachidonic acid, and behenic acid. Of these, lauric acid, myristic acid, palmitic acid, and stearic acid are preferable, and palmitic acid and stearic acid are more preferable.

As the glycerin fatty acid ester, specifically, lauric acid monoglyceride, myristic acid monoglyceride, palmitic acid monoglyceride, and stearic acid monoglyceride are preferable, and palmitic acid monoglyceride and stearic acid monoglyceride are more preferable.

In the rubber composition according to the present disclosure, the blending amount of the glycerin fatty acid ester composition with respect to 100 parts by mass of the silica is preferably 0.5 parts by mass or more, more preferably 1 part by mass or more, and still more preferably 1.5 parts by mass or more from the viewpoint of the processability of the rubber composition, and preferably 20 parts by mass or less, more preferably 10 parts by mass or less, and still more preferably 5 parts by mass or less from the viewpoint of the breaking resistance of the rubber composition.

<Other Components>

In addition to the foregoing components, the rubber composition according to the present disclosure may further comprise components typically used in the rubber industry, such as an age resistor, a vulcanization acceleration aid, and an organic acid compound, in a range that does not contradict the spirit of the present disclosure.

Preferably, the rubber composition according to the present disclosure comprises: the rubber component; 4 parts to 30 parts by mass of the styrene-alkylene block copolymer with respect to 100 parts by mass of the rubber component; 20 parts to 120 parts by mass of a filler containing silica with respect to 100 parts by mass of the rubber component; at least one vulcanization accelerator selected from the group consisting of guanidines, sulfenamides, thiazoles, thiourea, and diethylthiourea; a silane coupling agent; and a vulcanizing agent, wherein the rubber composition is obtained by a kneading step of kneading the rubber composition, and the kneading step includes: a kneading stage A in which the rubber component, the styrene-alkylene block copolymer, the filler, the whole or part of the vulcanization accelerator, and 2 parts by mass or more of the silane coupling agent with respect to 100 parts by mass of the rubber component are kneaded; and a kneading stage B in which, after the kneading stage A, a kneaded product prepared by the kneading in the kneading stage A and the vulcanizing agent are kneaded.

Thus, reduction in the activity of the coupling function of the silane coupling agent is favorably suppressed and the activity of the coupling function is further enhanced to yield a rubber composition excellent in low loss property.

<Kneading Step>

In the case of the rubber composition obtained by the foregoing kneading step, the kneading step includes at least the kneading stage A and the kneading stage B, and optionally further includes another kneading stage C.

—Kneading Stage A—

In the kneading stage A, a mixture containing the rubber component, the styrene-alkylene block copolymer, the filler, the whole or part of the vulcanization accelerator, and 2 parts by mass or more of the silane coupling agent with respect to 100 parts by mass of the rubber component is kneaded. A kneaded product (preliminary composition) is prepared by this kneading. The kneaded product (preliminary composition) prepared in the kneading stage A does not contain the vulcanizing agent.

In the kneading in the kneading stage A, the maximum temperature of the mixture is preferably 120° C. to 190° C., more preferably 130° C. to 175° C., and particularly preferably 140° C. to 170° C., from the viewpoint of enhancing the activity of the coupling function of the silane coupling agent more favorably.

In the kneading stage A, it is preferable to first blend and knead the rubber component, the styrene-alkylene block copolymer, the filler, and the silane coupling agent and then add the vulcanization accelerator to them and further knead the mixture.

—Kneading Stage B—

The kneading stage B is a stage in which, after the kneading stage A, the kneaded product (preliminary composition) prepared as a result of the kneading in the kneading stage A and the vulcanizing agent are kneaded. A rubber composition is prepared by this kneading. In the kneading stage B, the vulcanization accelerator may be further added.

In the kneading in the kneading stage B, the maximum temperature of the mixture is preferably 60° C. to 140° C., more preferably 80° C. to 120° C., and particularly preferably 100° C. to 120° C.

When (i) transitioning from the kneading stage A to the kneading stage B or (ii) transitioning from the below-described other kneading stage C to the kneading stage B in the case of performing the other kneading stage C (described later) between the kneading stage A and the kneading stage B, the transition to the kneading stage B preferably takes place after taking the kneaded product (preliminary composition) out and lowering the temperature of the kneaded product (preliminary composition) by 10° C. or more from the temperature immediately after the completion of the kneading in the kneading stage A or the other kneading stage C rather than ram raising/lowering or internal loading, as this enables differentiation.

—Kneading Stage C—

The other kneading stage C may be optionally further performed between the kneading stage A and the kneading stage B. The kneading stage C is a stage in which the kneaded product (preliminary composition) prepared in the kneading stage A is further kneaded. The kneading stage C may be performed a plurality of times. In the kneading stage C, the vulcanizing agent is not added.

In the kneading in the kneading stage C, the maximum temperature of the mixture is preferably 120° C. to 190° C., more preferably 130° C. to 175° C., and particularly preferably 140° C. to 170° C., from the viewpoint of enhancing the activity of the coupling function of the silane coupling agent more favorably.

A kneading apparatus used in the kneading in the kneading step is not limited, and may be selected as appropriate depending on the purpose. Examples include a single-screw kneading extruder: a multi-screw kneading extruder (continuous kneading apparatus); a kneader with a mesh-type or non-mesh-type spinning rotor such as a Banbury mixer, an intermixer, or a kneader; and a roll (a batch-type kneading apparatus). Conditions in the kneading, such as the rotational velocity of the rotor, the ram pressure, the kneading temperature, and the type of kneading apparatus, may be selected as appropriate.

(Preparation Method for Rubber Composition)

A preparation method for the rubber composition according to the present disclosure is not limited, and a commonly known kneading method may be used to knead components such as the rubber component, the styrene-alkylene block copolymer, and the filler.

As the preparation method for the rubber composition according to the present disclosure, a method of preparation by the foregoing kneading step including the kneading stage A and the kneading stage B is preferable.

(Tire)

A tire according to the present disclosure is a tire produced using the foregoing rubber composition.

Thus, both wet performance and low loss property can be achieved while delivering excellent dry handling performance.

A part in which the rubber composition is used is not limited, but the rubber composition is preferably used in the tread rubber of the tire.

EXAMPLES

The presently disclosed techniques will be described in more detail below by way of examples, although these examples are intended for illustrative purposes only, and are not intended to limit the scope of the present disclosure in any way. The examples include prophetic examples.

Specific materials for use in Examples are described below.

styrene butadiene rubber ("SBR1" in Table 2): synthesized by the blow-described method styrene butadiene rubber ("SBR2" in Table 2): synthesized by the blow-described method styrene butadiene rubber ("SBR3" in Table 2): Oil Extended SBR 0122 produced by JSR Corporation, styrene content: 37 mass % styrene-alkylene block copolymer (total styrene content: 15 mass %): DYNARON® 8600P produced by JSR Corporation, proportion of unit (A) to units (A)+(B): 68 mass % styrene-alkylene block copolymer (total styrene content: 32 mass %): SEPTON® 8007 produced by Kuraray Co., Ltd. (SEPTON is a registered trademark in Japan, other countries, or both), proportion of unit (A) to units (A)+(B): 41 mass % styrene-alkylene block copolymer (total styrene content: 35 mass %): DYNARON® 8903P produced by JSR Corporation, proportion of unit (A) to units (A)+(B): 70 mass % styrene-alkylene block copolymer (total styrene content: 53 mass %): DYNARON® 9901P produced by JSR Corporation, proportion of unit (A) to units (A)+(B): 70 mass % silica: trade name NIPSIL® AQ produced by Tosoh Silica Corporation (NIPSIL is a registered trademark in Japan, other countries, or both)

carbon black: trade name #80 produced by Asahi Carbon Co., Ltd.

silane coupling agent: bis(3-triethoxysilylpropyl)tetrasulfide, trade name Si69 produced by Evonik Japan Co., Ltd.

$C_5$-$C_9$-based resin ("C5/C9-based resin" in Table 2): trade name T-REZ RD104 produced by JXTG Nippon Oil & Energy Corporation $C_9$-based resin: trade name Nisseki Neopolymer 140 produced by JXTG Nippon Oil & Energy Corporation wax: microcrystalline wax, trade name OZOACE-0701 produced by Nippon Seiro Co., Ltd.

age resistor (6PPD): N-(1,3-dimethylbutyl)-N'-phenyl-p-phenylenediamine, trade name NOCRAC 6C produced by Ouchi Shinko Chemical Industrial Co., Ltd.

age resistor (TMQ): trade name NONFLEX RD-S produced by Seiko Chemical Co., Ltd.

vulcanization accelerator (DPG): 1,3-diphenylguanidine, trade name NOCCELER D produced by Ouchi Shinko Chemical Industrial Co., Ltd.

vulcanization accelerator (MBTS): di-2-benzothiazolyl disulfide, trade name NOCCELER DM produced by Ouchi Shinko Chemical Industrial Co., Ltd.

vulcanization accelerator (CBS): N-cyclohexyl-2-benzothiazolesulfenamide, trade name SANCELER CM-G produced by Sanshin Chemical Industry Co., Ltd.

Synthesis of SBR1 (Modified SBR)

In an 800 mL pressure-resistant glass container that has been dried and purged with nitrogen, a cyclohexane solution of 1,3-butadiene and a cyclohexane solution of styrene are added to yield 67.5 g of 1,3-butadiene and 7.5 g of styrene. Then, 0.6 mmol of 2,2-ditetrahydrofurylpropane is added, and 0.8 mmol of n-butyllithium is added. Subsequently, the mixture is polymerized for 1.5 hours at 50° C. Next, 0.72 mmol of N,N-bis(trimethylsilyl)-3-[diethoxy(methyl)silyl]

propylamine is added as a modifier to the polymerization reaction system when the polymerization conversion ratio reached nearly 100%, and a modification reaction is carried out for 30 minutes at 50° C. Subsequently, the reaction is stopped by adding 2 mL of an isopropanol solution containing 5 mass % of 2,6-di-t-butyl-p-cresol (BHT), and the result is dried by a usual method to obtain a modified SBR. As a result of measuring the microstructure of the modified SBR, the bound styrene content is 10 mass %.

Synthesis of SBR2 (Modified SBR)

In an 800 mL pressure-resistant glass container that has been dried and purged with nitrogen, a cyclohexane solution of 1,3-butadiene and a cyclohexane solution of styrene are added to yield 70.2 g of 1,3-butadiene and 39.5 g of styrene. Then, 0.6 mmol of 2,2-ditetrahydrofurylpropane is added, and 0.8 mmol of n-butyllithium is added. Subsequently, the mixture is polymerized for 1.5 hours at 50° C. Next, 0.72 mmol of N-(1,3-dimethylbutylidene)-3-triethoxysilyl-1-propaneamine is added as a modifier to the polymerization reaction system when the polymerization conversion ratio reached nearly 100%, and a modification reaction is carried out for 30 minutes at 50° C. Subsequently, the reaction is stopped by adding 2 mL of an isopropanol solution containing 5 mass % of 2,6-di-t-butyl-p-cresol (BHT), and the result is dried by a usual method to obtain a modified SBR. As a result of measuring the microstructure of the modified SBR, the bound styrene content is 35 mass %.

Examples 1 to 6 and Comparative Examples 1 to 5

Rubber compositions are prepared in accordance with the formulations listed in Tables 1 and 2. The rubber compositions are used in tread rubber to produce passenger vehicle radial tires having a tire size of 195/65R15 by a usual method.

TABLE 1

| Stage | Component | | Kneading method 1 Blending amount (parts by mass) | Kneading method 2 Blending amount (parts by mass) |
|---|---|---|---|---|
| Kneading stage A | Rubber component Styrene-alkylene block copolymer Thermoplastic resin Filler | Type indicated in Table 2 | Amount indicated in Table 2 | Amount indicated in Table 2 |
| | | Silane coupling agent | | |
| | | Stearic acid | 1.0 | 1.0 |
| | | Wax | 2.0 | 2.0 |
| | | Zinc oxide | 2.5 | 2.5 |
| | | DPG | 0.0 | 1.0 |
| | Age resistor | 6PPD | 4.0 | 4.0 |
| | | TMQ | 0.3 | 0.3 |
| Kneading stage B | Vulcanization accelerator | DPG | 0.8 | 0.8 |
| | | MBTS | 0.8 | 0.8 |
| | | CBS | 0.9 | 0.9 |
| | Vulcanizing agent | Sulfur | 1.5 | 1.5 |

TABLE 2

| | | Comparative Example 1 | Comparative Example 2 | Comparative Example 3 | Example 1 | Example 2 | Example 3 |
|---|---|---|---|---|---|---|---|
| Rubber component | SBR1 St content 10 mass % | — | — | — | — | — | — |
| | SBR2 St content 35 mass % | 50 | 50 | 50 | 50 | 50 | 50 |
| | SBR3 St content 37 mass % | 68.75 | 68.75 | 68.75 | 68.75 | 68.75 | 68.75 |
| Silica-silane reaction activity | Kneading method | Kneading method 1 | Kneading method 1 | Kneading method 2 | Kneading method 1 | Kneading method 1 | Kneading method 2 |
| Filler | Carbon black | 5 | 5 | 5 | 5 | 5 | 5 |
| | Silica | 85 | 85 | 85 | 85 | 85 | 85 |
| | Silane coupling agent | 8.5 | 8.5 | 8.5 | 8.5 | 8.5 | 8.5 |
| Styrene-alkylene block copolymer total styrene content | 15 mass % | — | 15 | — | — | — | — |
| | 32 mass % | — | — | — | 15 | — | — |
| | 35 mass % | — | — | — | — | — | — |
| | 53 mass % | — | — | — | — | 15 | 15 |
| Thermoplastic resin | C5/C9-based resin | 15 | 15 | 15 | 15 | 15 | 15 |
| | C9-based resin | 15 | — | — | — | — | — |
| Performance | Low loss property | 100 | 101 | 102 | 97 | 95 | 98 |
| | Dry handling performance | 100 | 100 | 98 | 134 | 151 | 145 |
| | Wet performance | 100 | 100 | 100 | 99 | 99 | 99 |

TABLE 2-continued

|  |  | Example 4 | Comparative Example 4 | Comparative Example 5 | Example 5 | Example 6 |
|---|---|---|---|---|---|---|
| Rubber component | SBR1 St content 10 mass % | — | 30 | 30 | 30 | 30 |
|  | SBR2 St content 35 mass % | 50 | 70 | 70 | 70 | 70 |
|  | SBR3 St content 37 mass % | 68.75 | — | — | — | — |
| Silica-silane reaction activity | Kneading method | Kneading method 1 | Kneading method 1 | Kneading method 1 | Kneading method 1 | Kneading method 1 |
| Filler | Carbon black | 5 | 5 | 5 | 5 | 5 |
|  | Silica | 85 | 85 | 85 | 85 | 85 |
|  | Silane coupling agent | 8.5 | 8.5 | 8.5 | 8.5 | 8.5 |
| Styrene-alkylene block copolymer total styrene content | 15 mass % | — | — | 15 | — | — |
|  | 32 mass % | — | — | — | 15 | — |
|  | 35 mass % | 15 | — | — | — | — |
|  | 53 mass % | 15 | — | — | — | 15 |
| Thermoplastic resin | C5/C9-based resin | 15 | 15 | 15 | 15 | 15 |
|  | C9-based resin | — | 15 | — | — | — |
| Performance | Low loss property | 99 | 100 | 101 | 94 | 92 |
|  | Dry handling performance | 134 | 100 | 100 | 131 | 151 |
|  | Wet performance | 99 | 100 | 100 | 99 | 99 |

(Performance Evaluation)

<Dry Handling Performance>

For each sample tire, the dry handling performance is evaluated in an actual vehicle test on a dry road surface based on a subjective score by the test driver. Samples having the same composition of rubber component are grouped together, and the dry handling performance is expressed as an index, with the dry handling performance for each of Comparative Examples 1 and 4 being 100. The evaluation results are listed in Table 2. A larger index indicates better dry handling performance of the tire.

<Wet Performance>

The test driver conducts various running on a wet road course, and the running performance of the tire during running is subjectively evaluated. The wet performance is expressed as an index, with the wet performance for each of Comparative Examples 1 and 4 being 100. The evaluation results are listed in Table 2. A larger index indicates better wet performance of the tire.

<Low Loss Property>

For vulcanization rubber obtained by vulcanizing each rubber composition at 145° C. for 33 min, the loss tangent (tan δ) is measured using a spectrometer produced by Ueshima Seisakusho Co., Ltd. under the conditions of temperature: 50° C., initial strain: 2%, dynamic strain: 1%, and frequency: 52 Hz. The tan δ is expressed as an index, with the tan δ for each of Comparative Examples 1 and 4 being 100. The evaluation results are listed in Table 2. A smaller index indicates better low loss property.

As can be understood from Table 2, with the rubber composition according to each Example, both wet performance and low loss property can be achieved while delivering excellent dry handling performance.

INDUSTRIAL APPLICABILITY

It is thus possible to provide a rubber composition that achieves both wet performance and low loss property while delivering excellent dry handling performance. It is also possible to provide a tire that achieves both wet performance and low loss property while delivering excellent dry handling performance.

The invention claimed is:

1. A rubber composition, comprising:
    a rubber component; and
    a styrene-alkylene block copolymer,
    wherein a total styrene content of the styrene-alkylene block copolymer is 30 mass % or more with respect to a total mass of the styrene-alkylene block copolymer,
    the rubber component contains a styrene butadiene rubber having a styrene content of 30 mass % or more,
    an alkylene block of the styrene-alkylene block copolymer has a —(CH$_2$—CH(C$_2$H$_5$))— unit (A) and a —(CH$_2$—CH$_2$)— unit (B), and
    a total content of the unit (A) is 40 mass % to 90 mass % with respect to a total mass of the whole alkylene block expressed as the unit (A)+the unit (B).

2. The rubber composition according to claim 1, wherein a proportion of the styrene butadiene rubber having a styrene content of 30 mass % or more in the rubber component is 50 mass % or more.

3. The rubber composition according to claim 1, further comprising wet silica,
    wherein a specific surface area by cetyltrimethylammonium bromide adsorption (CTAB) of the wet silica is 40 m$^2$/g to 300 m$^2$/g, and a BET specific surface area of the wet silica is 40 m$^2$/g to 350 m$^2$/g.

4. The rubber composition according to claim 1, further comprising a thermoplastic resin.

5. The rubber composition according to claim 1, wherein the total styrene content is 50 mass % or more with respect to the total mass of the styrene-alkylene block copolymer.

6. The rubber composition according to claim 1, wherein the styrene-alkylene block copolymer is a styrene-ethylenebutylene-styrene block copolymer.

7. A tire produced using the rubber composition according to claim 1.

8. The rubber composition according to claim 2, further comprising wet silica, wherein a specific surface area by cetyltrimethylammonium bromide adsorption (CTAB) of the wet silica is 40 m²/g to 300 m²/g, and a BET specific surface area of the wet silica is 40 m²/g to 350 m²/g.

9. The rubber composition according to claim 2, further comprising a thermoplastic resin.

10. The rubber composition according to claim 2, wherein the total styrene content is 50 mass % or more with respect to the total mass of the styrene-alkylene block copolymer.

11. The rubber composition according to claim 2, wherein the styrene-alkylene block copolymer is a styrene-ethylenebutylene-styrene block copolymer.

12. A tire produced using the rubber composition according to claim 2.

13. The rubber composition according to claim 3, further comprising a thermoplastic resin.

* * * * *